United States Patent [15] 3,689,500
Böhner et al. [45] Sept. 5, 1972

[54] O,O-DIETHYL-O-[1-METHYL-3-PHENYL-S-TRIAZOLYL-(5)] PHOSPHOROTHIOATE

[72] Inventors: Beat Böhner, Binningen/BL; Kurt Gubler, Riehen/BS, both of Switzerland

[73] Assignee: Ciba—Geigy Corporation, Ardsley, N.Y.

[22] Filed: Nov. 16, 1970

[21] Appl. No.: 90,100

[52] U.S. Cl. .............260/308 R, 260/308 C, 424/23, 424/200
[51] Int. Cl. ...........................C07f 9/08, C07f 9/16
[58] Field of Search ....................260/308 R

[56] References Cited

FOREIGN PATENTS OR APPLICATIONS

| 713,278 | 8/1954 | Great Britain.............260/308 |
| 1,299,924 | 7/1969 | Germany...................260/308 |

Primary Examiner—Alton D. Rollins
Attorney—Karl F. Jorda and Frederick H. Rabin

[57] ABSTRACT

O,O-Diethyl-O-[1-methyl-3-phenyl-s-triazolyl-(5)] phosphorothioate is an active agent for the control of pests.

1 Claim, No Drawings

O,O-DIETHYL-O-[1-METHYL-3-PHENYL-S-TRIAZOLYL-(5)] PHOSPHOROTHIOATE

DESCRIPTION OF THE INVENTION

The present invention concerns new triazolyl phosphates, process for the production thereof, pesticidal compositions containing these new phosphates as active ingredients and method for the control of pests using the new active substances or compositions containing them.

The new triazolyl phosphates correspond to the Formula I

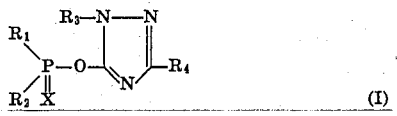

In this formula:

$R_1$ and $R_2$ each independently represent a lower alkoxy radical, $R_3$ represents a lower alkyl radical or the phenyl radical, $R_4$ represents hydrogen, a lower alkyl radical, or a phenyl or benzyl radical optionally substituted by lower alkyl, alkoxy and/or halogen, and X represents oxygen or sulphur.

In Formula I, all of the alkoxy groups are such having one to four carbon atoms such as methoxy, ethoxy, n-propoxy, isopropoxy, n-butoxy, isobutoxy, sec-butoxy, tert-butoxy. The substituents $R_1$ and $R_2$ can designate the same or different alkoxy radicals. Lower alkyl radicals represented by the symbols $R_3$ and $R_4$ as well as substituents of a phenyl or benzyl radical as $R_4$ likewise have from one to four carbon atoms. Halogen substituents of a phenyl or benzyl radical as $R_4$ are chlorine, bromine and iodine.

The new triazolyl phosphates of Formula I are produced according to the invention by reacting a. a hydroxy-triazole of the Formula II

with a phosphoric acid halide of the Formula III

in the presence of an acid-binding agent, or b. a metallic salt of a hydroxy-triazole of the Formula II with a phosphoric acid halide of the Formula III. Salts of hydroxy-triazoles of Formula II which are suitable for the process of the invention are in particular the alkali-metal salts, in addition however, for example, also the salts of monovalent heavy metals. The symbols $R_1$ to $R_4$ and X in Formulas II and III have the meanings given for Formula I.

Suitable as acid-binding agents are, for example, the following bases: tertiary amines such as triethylamine, dimethylaniline, pyridine, pyridine bases, inorganic bases such as hydroxides and carbonates of alkali metals and alkaline earth metals, preferably sodium and potassium carbonate.

It is recommended to perform the reactions in the presence of solvents or diluents which are inert to the reaction components. Suitable for this purpose are, for example, the following: aromatic hydrocarbons such as benzene, toluene, benzines, halogenated hydrocarbons, chlorobenzene, polychlorobenzenes, bromobenzene, chlorinated alkanes having one to three carbon atoms, ethers such as dioxane, tetrahydrofuran, esters such as ethyl acetate, ketones such as methyl ethyl ketone, diethyl ketone.

For the reaction (a), hydroxy-triazole + phosphoric acid halide, in order to increase the yield as well as to accelerate the reaction, it is advisable to add heavy metal salts to the reaction mixture, for example copper halides or mercury halides, or metallic powder such as copper powder, in catalytic amounts.

The starting materials of Formula II are known compounds or can be produced by known methods.

The new triazolyl phosphates of Formula I possess excellent insecticidal and acaricidal properties and are very suitable for the control of biting and sucking insects for the protection of plants and stored goods. Furthermore their favorable toxicity to warm-blooded animals permits their use for veterinary purposes and in hygiene. For example, the new phospates of Formula I can be employed for the control of the following arthropods and their various stages of development (larvae and eggs):

insects of the families Muscidae, Stomoxidae and Culicidae, e.g. against the polyvalent-resistant and normally sensitive house flies (*Musca domestica*), stable flies (*Stomoxys calcitrans*) and mosquitoes (e.g. *Aedes Aegypti, Culex fatigans, Anophenles stephensi*); against insects of the families Curculinidae, Bruchididae, Dermestidae, Tenebrionidae and Chrysomelidae, e.g. granary weevils (*Sitophilus granarius*), bean beetles (*Bruchidus obtectus*), larder beetles (*Dermestes vulpinus*), mealworms (*Tenebrio molitor*), Colorado potato beetles (*Leptinotarsa decemlineata*) and their larval stages; against insects of the family Pyralididae, e.g. Mediterranean flour moths (*Ephestia kuhniella*), of the family Blattidae, e.g. cockroaches (*Phyllodromia germanica*, Periplaneta, *Blatta orientalis*), of the family Aphididae, e.g. bean aphids (*Aphis fabae*), of the family Pseudococcidae, e.g. citrus mealybugs (*Planococcus citri*) and of the family Locustidae, e.g. migratory locusts (*Locusta migratoria*), arachnids of the families Acarinae, Ixodidae, Arachnidae and Argasidae.

In admixture with synergists and auxiliaries having a similar action such as dibutyl succinate, piperonyl butoxide, olive oil, and peanut oil, etc., the range of action of the said active substances can be broadened and in particular the insecticidal action can be improved.

The insecticidal action can be substantially broadened and adjusted to the prevailing conditions by the addition of other insecticides such as, for example, phosphoric, thio- and dithiophosphoric and phosphonic acid esters and amides, e.g. thiophosphoric and dithiophosphoric acid esters of heterocyclic compounds which are enolizable such as esters of thiadiazole-2,5-diones, thiazolidinylpyridine-2,6-diones, pyrimidin-4-ones, etc., in addition, 0,0-dialkyl 0-vinyl phosphates, halogenated hydrocarbons and analogs of DDT-active substance as well as pyrethrines and synergists thereof, acaricidally active substances such as halogenobenzilic acid esters such as 4',4'-dichlorobenzilic acid esters and 4',4'-dibromobenzilic acid esters, insecticidal and acaricidal carbamates, for example oxime carbamates, aryl carbamates and carbamates of heterocyclic compounds which are enolizable.

The following examples illustrate the production of the new triazolyl phosphates. Other phosphates of the Formula I, which were produced by the processes described in the examples, are given in the following table. The temperatures are given in degrees centigrade.

EXAMPLE 1

Eight g of 1-phenyl-3-methyl-s-triazol-5-one are refluxed for 15 minutes with 6.9 g of potassium carbonate, a spatula tip of copper powder, and 150 ml of methyl ethyl ketone. After cooling to 60°, 8.7 g of 0,0-diethyl thiophosphoric acid chloride are added dropwise thereto. After refluxing for 3 hours, the mixture is cooled to room temperature, the salts which precipitate are removed by filtration, and the solvent is evaporated under vacuum. Fifteen g of a yellow oil are obtained, which according to thin-layer chromatography consists substantially of 0,0-di-ethyl 0-]1-phenyl-3-methyl-3-triazolyl--(5)] phosphorothioate.

To obtain an analysis pure product, the crude product is filtered over 20 times the amount of silica gel (0.05–0.2 mm) first with methylene chloride and then with methylene chloride which contains 1 percent methanol. In this manner, 8.7 g of pure 0,0-diethyl 0 - [1-phenyl-3-methyl-s-triazolyl-(5)] phosphorothioate are obtained as a light yellow oil [$n_D^{20} = 1.5372$] which crystallizes upon standing, m.p. 48°–49°.

EXAMPLE 2

12.8 g of 1-methyl-3-phenyl-s-trazol-5-one are refluxed with 10.1 g of potassium carbonate, a spatula tip of copper powder and 200 ml of methyl ethyl ketone for 1 hour. After cooling to 20+, 13.8 g of 0,0-diethyl thiophosphoric acid chloride are added dropwise. After refluxing for 3 hours, the mixture is cooled to room temperature, the precipitated salts are removed by filtration and the solvent is evaporated under vacuum. The oily residue is taken up in 500 ml of ether and washed once with 50 ml of water and twice with 30 ml each of brine. The ether is dried over $Na_2SO_4$ and evaporated under vacuum. 19.7 g of a yellow oil remain, which according to thin layer chromatography consists substantially of 0,0-diethyl 0-[1-methyl-3-phenyl-s-triazolyl-(5)] phosphorothioate.

To obtain an analysis pure product, the crude product is chromatographed over 17 times the amount of silica gel (0.05–0.2 mm) using methylene chloride as eluant. In this manner, 15.0 g of pure 0,0-diethyl 0-[1-methyl-3-phenyl-s-triazolyl-(5)] phosphorthioate are obtained as light yellow oil, $n_D^{20} = 1.5443$.

| Compounds: | physical data: |
|---|---|
| O,O-diethyl o-[1-methyl-1,2,4-triazolyl(5)]phosphorothioate | b.p. 86°/0.001 Torr |
| 0,0-diethyl O-[1-methyl-e-isopropyl-1,2,4-triazolyl(5)] phosphorothioate | b.p. 95–98°1 0.008 Torr |
| 0.0-diethyl O-[1,3-dimethyl-1,2,4-triazolyl(5))]phosphorothioate | b.p. 88–90°/ 0.007 Torr |
| 0,0-diethyl O-[1-methyl-3-(4'-methyl phenyl)-1,2,4-trizaolyl(5)] phosphorothioate | m.p. 75° |
| 0,0-diethyl O-[1-methyl-3-benzyl-1,2,4-triazolyl(5)]phosphorothioate | $n_D^{23} = 1.5265$ |
| 0,0-diethyl O-[1-phenyl-3-benzyl-1,2,4-1-phenyl-3-benzyl-1,2,4-triazolyl(5)]phosphorothioate | $n_D^{20} = 1.5634$ |

The insecticidal action of the new phosphoric acid esters is illustrated by the following tests:

1. Effect as insecticidal contact poison
   a. Petri dishes are coated with acetone solutions of the active substances so that they are covered with 0.15 mg and 1.5 mg of active substance per square meter. After 1 hour the following test animals are placed in the dishes:
      1. polyvalent-resistant house flies (Musca domestica),
      2. mosquitoes (Aedes aegypti)
      3. stable fly maggots (Stomoxys calcitrans).

In Table 1 the time is given after which all (100 percent) of the animals are in dorsal position.

b. 20 mg of a 1 percent dust are evenly distributed in Petri dishes. Cockroaches (Phyllodromia germanica and Periplaneta americana) are then placed in the dishes and kept under normal conditions at 22°–24 C.

c. Granary weevils are sprayed from a spray nozzle at a distance of 10 cm with 20 cm³ of a 1 percent acetone solution of the active substance. Directly after application, the animals are transferred to clean petri dishes and kept at 22° C.

In Table 2 the time is given after which all of the animals are in dorsal position.

TABLE 1

| | 100% of the animals in dorsal position after X minutes | | | |
|---|---|---|---|---|
| | house flies | mosquitoes | stable fly maggots | Active substance: |
| | 1.5 mg/m² | 0.15 mg/m² | 0.15 mg/m³ | mg/m² |
| 0,0-diethyl-0-[1-methyl-3-phenyl-s-triazolyl-(5)]- phosphorothioate | 30' | 180' | 30' | 20' |
| 0,0-diethyl-0-[1,3-dimethyl-s-triazolyl-(5)]-phosphorothioate | 10' | 20' | 10' | 30' |
| 0,0-diethyl-0-[1-methyl-3-isopropyl-s-triazolyl-(5)]-phosphorothioate | 25' | 50' | 10' | 5' |
| 0,0-diethyl-0-[1-phenyl-3-methyl-s-triazolyl-(5)]-phosphorothioate | 30' | 120' | 30' | 10' |
| 0,0-diethyl-0-[1-phenyl-s-triazolyl-(3)]-phosphorothioate (cf. German patent application open for public inspection No. 1,299,924) | 60' | 300' | 60' | 30' |

TABLE 2

| Active substance: | 100% of the animals in dorsal position after X minutes or hours | |
|---|---|---|
| | cockroaches | granary weevils |
| 0,0-diethyl-0-[1-methyl-3-phenyl-s-triazolyl-(5)-phosphorothioate | 180' | 300' |
| 0,0-diethyl-0-[1,3-dimethyl-s-triazolyl-(5)]-phosphorothioate | 240' | 30' |
| 0,0-diethyl-0-[1-methyl-3-isopropyl-s-triazolyl-(5)]-phosphorothioate | 30' | 30' |

| | | |
|---|---|---|
| O,O-diethyl-O-[1-phenyl-3-methyl-s-triazolyl-(5)]-phosphorothioate | 240' | 120' |
| O,O-diethyl-O-[1-phenyl-s-triazolyl-(3)]-phosphorothioate (cf. German patent application open for public inspection No. 1,299,924) | 300' | 120' |

2. Long-lasting insecticidal effect

The active substances are applied from an aqueous suspension in a concentration of 1 g per square meter to wooden boards. The treated boards are suspended in stables for several days. A control is made after 1, 8 and 28 days by taking the boards into the laboratory and placing normally sensitive and polyvalent-resistant house flies (*Musca domestica*), stable fly maggots (*Stomoxys calcitrans*) and mosquitoes (*Aedes aegypti*) on them.

In the following table 3, the time is give in minutes after which the animals (100 percent) are in dorsal position.

TABLE 3

| | house flies | | | | | | stable flies | | | mosquitoes | | |
|---|---|---|---|---|---|---|---|---|---|---|---|---|
| | normally sensitive | | | polyvalent resistant | | | | | | | | |
| Active substance: | 1 | 8 | 28 | 1 | 8 | 28 | 1 | 8 | 28 | 1 | 8 | 28 |
| O,O-diethyl O-[1-methyl-3-phenyl-triazoly)L(5)]-phosphorothioate | 30 | 80 | 50 | 40 | 70 | 70 | 30 | 50 | 50 | 55 | 70 | 80 |
| O,O-dimethyl O-[4-methyl-thio-3-methyl-phenyl]-phosphorothioate* | 30 | 80 | 300 | 100 | 120 | 120 | 70 | 80 | 300 (92%) | 60 | 60 | 300 (85%) |

*Commercial product: known from German patent application open for public inspection No. 1,116,656 [Baytex]

3. Effect as insecticidal stomach poison

Potato greens are dipped in a 0.1 percent aqueous solution of the active substance (obtained from a 10 percent emulsifiable concentrate). After the coating has dried, Colorado potato beetles (*Leptinotarsa decemlineata*) are placed on the greens.

In the following Table 4 the time is given in minutes after which all (100 percent) of the animals are in dorsal position.

TABLE 4

| Active substance: | 100% of the animals in dorsal position after X minutes potato beetle larvae |
|---|---|
| O,O-diethyl O-[1-methyl-3-phenyl-s-triazolyl-(5)]phosphorothioate | 300' |
| O,O-diethyl O-[1,3-dimethyl-s-triazolyl-(5)]phosphorothioate | 120' |
| O,O-diethyl O-]1-methyl-3-isopropyl-s-triazolyl-(5)]phosphorothioate | 120' |
| O,O-diethyl O-[1-phenyl-s-triazolyl-(3)]-phosphorothioate (cf. German patent application open for public inspection No. 1,299,924) | 300' |

As the tests show, the triazolyl phosphates according to the invention possess a better insecticidal action than compounds of closest structure known from the German patent-application open for public inspection No. 1,299,924 and the commercial products Baytex. Another advantage of the new triazolyl (5) phosphates of Formula I is their substantially more favorable toxicity to warm-blooded animals. Thus, for example, the O,O-diethyl O-[3-phenyl-1-methyl-1,2,4-triazolyl(5)] phosphorothioate of the invention has the $DL_{50}$ of 957 mg/kg of body weight (rat p.o.), the known O,O-diethyl O-[1-phenyl-1,2,4-triazolyl(3)] phosphorothioate the $DL_{50}$ of 90–110 mg/kg of body weight (mouse p.o.), and the best known commercial product for the control of flies in stables, O,O-dimethyl O-(4-methylthio-3-methyl-phenyl) phosphorothioate [Baytex], the $DL_{50}$ of 200–250 mg/kg of body weight (rat p.o.).

The production of pesticidal compositions according to the invention is preformed in known manner by intimately mixing and grinding the active substances of the Formula I with suitable carriers, optionally with the addition of dispersing agents or solvents, which are inert towards the active substances. The novel active substances can be prepared in the following forms:

solid preparations:
  dusts, scattering agents, granulates, (coated granulates, impregnated granulates and homogeneous granulates);
water-dispersible concentrates of the active substance:
  wettable powders, pastes, emulsions;
liquid preparations:
  solutions, aerosols.

The concentration of active substance in these preparations is form 0.01 to 80 percent. The concentration for applying the active substance to those compositions which are ready-for-use is in practice generally less than 5 percent, preferably from 0.01 to 2 percent. Other biocidally active substances or agents can be admixed with the agents according to the invention. Thus, in addition to the said active substances of the Formula I and salts thereof, the new compositions may contain, for example other insecticides, fungicides, bactericides, fungistatic and bacteriostatic substances or nematocides in order to broaden the range of action. The compositions according to the invention may also contain plant fertilizers, trace elements etc.

The following forms for application of the pesticidal compositions according to the invention are presented to illustrate the invention; where not expressly stated otherwise, "parts" mean parts by weight.

Dust

The following ingredients are used to produce (a) a 5 percent and (b) a 2 percent dust:

a.
  5 parts of O,O-diethyl O-[1-methyl-3-phenyl-s-triazolyl-(5) phosphorothioate,
  95 parts of talcum;

b.
  2 parts of O,O-diethyl O-[1,3-dimethyl-s-triazolyl-(5)]phosphorothioate,
  1 part of highly dispersed silicic acid,
  97 parts of talcum.

The active substances are mixed and ground with the carriers. The dusts obtained are used, for example, for the control of cockroaches and ants, etc. in buildings, but also in the protection of plants.

Granulate

The following ingredients are used to produce a 5 percent granulate:

5 parts of 0,0-diethyl 0-[1-methyl-3-isopropyl-s-triazolyl-(5)] phosphorothioate,
0.25 part of epichlorohydrin,
0.25 part of cetyl polyglycol ether,
3.50 parts of polyethylene glycol ("Carbowax"),
91 parts of kaolin (granular size 0.3 – 0.8 mm).

The active ingredient is mixed with epichlorohydrin and dissolved with 6 parts of acetone; then the polyethylene glycol and cetyl polyglycol ether are added. The resulting solution is sprayed onto kaoline and then the acetone is evaporated in vacuum. The granulate obtained is suitable for the protection of plants and stored goods.

Wettable powder

To produce a (a) 40 percent, (b) 50 percent, (c) 25 percent, and (d) 10 percent wettable powder, the following components are used:

a.
40 parts of 0,0-diethyl 0-[1-methyl-3-phenyl-s-triazolyl-(5)] phosphorothioate,
5 parts of sodium lignin sulphonate,
1 part of sodium dibutyl-naphthalene sulphonate
54 parts of silicic acid;

b.
50 parts of 0,0-diethyl 0-[1,3-dimethyl-s-triazolyl-(5)] phosphorothioate,
5 parts of alkyl aryl sulphonate ("Tinovetine B"),
10 parts of calcium lignin sulphonate,
1 part of Champagne chalk/hydroxyethyl cellulose mixture (1:1),
20 parts of silicic acid,
14 parts of kaolin;

c.
25 parts of 0,0-diethyl 0-[1-methyl-3-isopropyl-s-triazolyl-(5)] phosphorothioate,
1 part of sodium dibutylnaphthalene-sulphonate,
5 parts of naphthalene-sulphonic acid/formaldehyde condensation product,
4 parts of magnesium carbonate,
20 parts of Champagne chalk,
25 parts of sodium aluminum silicate,
20 parts of kaolin;

d.
10 parts of 0,0-diethyl 0-[1-phenyl-3-methyl-s-triazolyl-(5)] phosphorothioate,
3 parts of mixture of sodium salts of saturated fatty alcohol sulphates,
5 parts of naphthalene sulphonic acid/formaldehyde condensation product,
82 parts of kaolin.

The active substances are intimately mixed in suitable mixers with the additives and ground on appropriate mills and rollers. Wettable powders are obtained which may be diluted with water to suspensions of any desired concentration. Such suspensions are chiefly used in plant protection for the control of biting and sucking insects.

Spray

To produce (a) a 5 percent and (b) a 2 percent spray, the following components are used:

a.
5 parts of 0,0-diethyl 0-[1-methyl-3-phenyl-s-triazolyl-(5)] phosphorothioate,
1 part of epichlorohydrin,
94 parts of benzine (boiling range 160°–190°);

b.
2 parts of 0,0-diethyl 0-[1,3-dimethyl-s-triazolyl-(5)] phosphorothioate,
3 parts of 4,4'-dichlorodiphenyl-trichloroethane,
95 parts of kerosene.

These solutions are sprayed with pressure sprayers. The solution (a) is advantageously used for the control of aphids on fruit trees and other plants. The solution (b) is used in particular for the control of flies and mosquitoes in living quarters, warehouses and slaughter-houses.

Emulsifiable Concentrate

To produce a 25 percent emulsifiable concentrate,
25 parts of 0,0-diethyl 0-[1-methyl-3-isopropyl-s-triazolyl-(5)] phosphorothioate,
2.5 parts of epichlorohydrin,
5 parts of alkyl aryl polyethylene glycol, and
67.5 parts of xylene are mixed together. This concentrate may be diluted with water to any desired concentration. Such concentrates are particularly suitable for the control of insects in granaries, warehouses and on cultivated plants.

We claim:

1. The compound 0,0-diethyl-0-[1-methyl-3-phenyl-s-triazolyl-(5)]phosphorothioate.

* * * * *